ically in the presence of inert solvents. Suitable solvents include, for example, benzene hydrocarbons, cycloaliphatic, aromatic or aliphatic hydrocarbons such as benzene, toluene, xylene, isopropylbenzene, diisopropylbenzene, cyclohexane, isopropylcyclohexane, as well as aliphatic or aromatic halogenated hydrocarbons such as methylene chloride, chloroform, carbon tetrachloride, tetrachlorethane, chlorinated benzene, as well as ketones, ethers and esters such as cyclohexanone, diethyl ether, dibutyl ether, anisol, ethyl acetate, butyl acetate, amyl acetate, dibutyl phthalate, and ethylene glycol monomethylether-acetate.

3,455,965
PRODUCTION OF MODIFIED HOMOPOLYMERS AND COPOLYMERS OF CONJUGATED DIENES CONTAINING EPOXIDE GROUPS

Bernhard Schleimer and Walter Dittmann, Marl, Germany, assignors to Chemische Werke Huls Aktiengesellschaft, Marl, Germany
No Drawing. Filed July 9, 1964, Ser. No. 381,540
Claims priority, application Germany, July 23, 1963, C 30,510
Int. Cl. C07d 1/00; C08f 27/22
U.S. Cl. 260—348                                9 Claims

ABSTRACT OF THE DISCLOSURE

An epoxidized viscous liquid reaction product of a polymer of a diolefin selected from the group consisting of butadiene, isoprene, piperylene, chloroprene, phenylbutadiene, 2,3-dimethylbutadiene, cyanobutadiene, and mixtures thereof, said polymer having an average molecular weight of at least 300, and a polyhalogenated cyclopentadiene, the weight concentration of epoxide oxygen in said epoxidized reaction product being 0.5–15%.

---

The present invention relates to the production of modified homogeneous and copolymers of conjugated dienes containing epoxide groups. More particularly, it relates to the production of modified homogeneous and copolymers of conjugated dienes containing epoxide groups by subjecting to epoxidization the homo- and copolymers of conjugated dienes, as well as the copolymers of conjugated dienes with other unsaturated compounds capable of copolymerization, either before or after being reacted with polyhalocyclopentadiene.

It has been known that polyhalogenated cyclopentadiene can be reacted with low molecular weight monomeric olefins, with homo- or co-conjugated diene polymers, and also with conjugated diene polymers with other vinyl compounds capable of copolymerization. It is also known in the prior art that monomeric and polymeric unsaturated compounds can be epoxidized by reaction with per-compounds.

It has now been found in accordance with the present invention that uniquely modified homo- and copolymers of conjugated dienes with epoxy groups and with desirable properties can be produced if homo- or copolymers of conjugated dienes, and also copolymers of conjugated dienes with other unsaturated compounds of copolymerization, are epoxidized in a conventional manner either before or after their reaction in a known manner with polyhalogenated cyclopentadiene.

The new polymers of the present invention can be prepared either by reatcion of the previously epoxidized polymer with polyhalogenated cyclopentadiene, or by the epoxidation of the unsaturated polymers after complete reaction with polyhalogenated cyclopentadienes.

The homo- or copolymers of conjugated dienes of the present invention can be any of the polydiolefins of butadiene, isoprene, piperylene, chloroprene, phenylbutadiene, 2,3-dimethylbutadiene, cyanobutadiene, and the like, and mixtures thereof.

The polydiolefins used in the epoxidation and for reaction with polyhalogenated cyclopentadiene generally do not have any unique steric structure but can exist in a variety of such structures, since the steric structure of polydiolefin appears not to be of particular importance. Use can be made of the 1,4-cis or the 1,4-transpolymer with mid-positioned double bonds, as well as of the 1,2- and the 3,4-polymer with vinyl- or vinylidene double bonds in the side chains, either alone or as mixed polymers.

Examples of olefins that can be used in producing copolymers with diolefins of the type described above, and which may be present in the polymers of the starting material together with the conjugated dienes include such olefins as styrene, alpha-methyl-styrene, o-, m-, or p-chlorstyrene, vinyl naphthalene, acrylic acid ester, vinyl cyclohexene, vinyl cyclohexene, acrylonitrile, methacrylic acid ester, vinyl acetate and methacrylonitrile.

Preferred polymers include those with relatively low molecular weights of between about 300 and about 50,000, and preferably between 300 and 20,000, since such polymers are generally liquids and hence require little, if any, diluent during their reaction with polyhalogenated cyclopentadienes. Especially suited is a 1,4-polybutadiene having an average molecular weight of between 500 and 50,000, and preferably between 1,000 and 20,000, which contains predominantly cis-double bonds and only slight amounts of trans-double bonds and whose vinyl-double bonds are less than 1%.

The epoxidation of the above homo- or copolymers can be effected by customary methods, e.g. with per-acids such as performic, peracetic, perpropionic, perbutyric or perbenzoic acids, or with aldehyde peracylates such as acetaldehyde-monoperacetate. The reaction can be effected in either homogeneous or heterogeneous phase, e.g. in "situ" with hydrogen peroxide and formic acid or acetic acid, and, if desired, with the addition of a catalyst such as sulfuric acid or sulfo-group containing ion exchangers.

The reaction temperature can range from −10 to +80° C., and preferably ranges from 0 to 40° C.

The reaction can be effected, if desired, in the presence of inert solvents. Suitable solvents include, for example, benzene hydrocarbons, cycloaliphatic, aromatic or aliphatic hydrocarbons such as benzene, toluene, xylene, isopropylbenzene, diisopropylbenzene, cyclohexane, isopropylcyclohexane, as well as aliphatic or aromatic halogenated hydrocarbons such as methylene chloride, chloroform, carbon tetrachloride, tetrachlorethane, chlorinated benzene, as well as ketones, ethers and esters such as cyclohexanone, diethyl ether, dibutyl ether, anisol, ethyl acetate, butyl acetate, amyl acetate, dibutyl phthalate, and ethylene glycol monomethylether-acetate.

In carrying out the operation the per-acid is usually added dropwise with stirring either to the starting polymer or to the latter in an inert solvent of the character disclosed above. The heat of reaction is removed with a cooling agent and the temperature is thus kept at the desired level. The reaction time is generally quite short so that the epoxidation process can generally be operated continuously, e.g. with the aid of a cascade apparatus.

In working up the product, the carboxylic acid into which the per-acid is converted can be removed by washing in the usual manner with alkalies. Any other suitable method, however, can be used, as for example, azeotropic distillation with aromatic liquids such as toluene, xylene, ethylbenzene or other suitable liquids. The desired amount of epoxide oxygen can be regulated in a simple manner by the amount of per-acid added.

The polyhalogenated cyclopentadienes to be reacted with epoxidized diene-, homo- or copolymers include especially the cyclopentadienes which have been substituted by the halides, chlorine, bromine or fluorine, either singly or in combination. This includes not only the polyhalogenated cyclopentadienes themselves such as hexachlor-, hexabromo- or tetrachlordibromo-, tetrachlordifluorcyclopentadiene, and the like, but also those cyclopentadienes which also carry other substituents such as alkyl-, alkoxy-, cycloalkylaryl- or other groups. Specific examples of these include: tetrachlordimethoxy-, tetrachlordiethoxy-, methylpentachlor-, ethylpentachlor-, beta-chlorethylpentachlor-, n-propylpentachlor-, n-butylpentachlor-, dimethyltetrachlor-, diethyltetrachlor-, octadecylpentachlor-, cyclohexylpentachlor-, and phenylpentachlorcyclopentadiene.

The epoxidized unsaturated polymers are reacted with the polyhalogenated cyclopentadienes in homogeneous phase without any diluent at a temperature of 50 to 200° C., and preferably between 100 and 180° C. If inert diluents are employed the reaction is then carried out at a temperature not in excess of the boiling point of the liquid. The reaction can be carried out either under normal or under elevated pressure.

The inert solvent used in the preparation of these addition products is selected from those whose boiling points are in the temperature ranges required for the reaction, and preferably those having boiling points in excess of 75° C. Those which are especially suitable include: the benzene hydrocarbons, cycloaliphatic, aromatic or aliphatic hydrocarbons such as benzene, toluene, xylene, isopropylbenzene, diisopropylbenzene and cyclohexane, aliphatic or aromatic halogenated hydrocarbons, such as tetrachlorethane or chlorbenzene; ketones, ethers, and esters such as ethyleneglycol-monomethyletheracetate, amyl acetate, dibenzyl ether, and dibutyl phthalate.

The inert diluents are added in quantities of 0.1 to 50 times, preferably 1 to 10 times that of the epoxidized polymer.

A further advantage of the present process is that there do not need to be any acid-binding substances present during the reaction because under suitable conditions a portion of the epoxide groups of the polymers will bind the hydrohalide that is produced by side reactions.

To avoid the formation of reticulated structures and to obtain light-colored reaction products, the addition is advantageously performed in an inert atmosphere under nitrogen or inert gases and in the absence of atmospheric oxygen and peroxides.

The epoxide content of the polymers to be introduced, the relative amounts of the reaction partners and of the diluent optionally to be introduced, depend on the properties which are desired for the reaction products and determine the possibility of obtaining such properties. Specifically, it is found that reaction products from polymers in which 20 to 80% or more of the double bonds are epoxidized, after being reacted with polyhalogenated cyclopentadiene can be hardened by the usual methods into flameproof epoxide resins. The corresponding epoxy oxygen content is 0.5 to 15% by weight, and the iodine number 0 to 400. If the polymers of this invention in which 0.5 to 30% of the double bonds are epoxidized are reacted with polyhalogenated cyclopentadiene, the reaction products are suitable for the preparation of flameproof paints, lacquers and impregnants being resistant to chemicals. For the preparation of products of this kind it is advantageous to use those solvents which can be permitted to remain in the final products and whose presence in lacquers will not interfere with the physical drying thereof. Finally, for high flame resistance, a high halogen content is to be preferred. For that purpose halogen contents of 10% to 40% are sufficient, but they may be either lower or higher. They are lower when a halogen is substituted in the polyhalogenated cyclopentadiene by a phosphorus group, as e.g. a dialkylphosphorous acid residue or by a dialkylphosphoric acid residue. The epoxidized polymer will take on at the most one molecule of polyhalogenated cyclopentadiene per each double bond.

In many cases, especially when it is intended to use the reaction product as a point or lacquer, a deficit of polyhalogenated cyclopentadiene is used or the reaction is interrupted before completion so that only part of the double bonds of the polyhalocyclopentadiene undergo addition reactions, the remaining double bonds then remaining available for chemical drying.

The heating of the unsaturated or the epoxidized unsaturated polymers with the polyhalocyclopentadienes, which can in some cases be under pressure, is continued until upon adding equimolar or smaller amounts of polyhalocyclopentadiene per double bond, the typical odor of the polyhalocyclopentadiene is no longer noticeable. Generally 8 to 20 hours are required for this. If the reaction is interrupted at an earlier time, or if an excess of polyhalocyclopentadiene is used, then the latter can be distilled off under normal pressure or under vacuum with the diluent present, or it can be removed by washing or precipitating the polymer.

The same reaction products are obtained if in accordance with the second variant of this invention the homo- or copolymers of conjugated dienes, or conjugated dienes with other unsaturated compounds capable of copolymerization, are reacted with polyhalocyclopentadienes, and thereafter some or all of the remaining free double bonds epoxidized.

The viscous liquid reaction products which are produced either by addition of polyhalocyclopentadienes to olefinic unsaturated polymers with subsequent epoxidation of the products thus obtained or by initial epoxidation of olefinic unsaturated polymers and subsequent addition of polyhalocyclopentadiene, are soluble at least in aromatic liquids and chlorinated hydrocarbons. They are suitable for use as flame resistant and chemical and corrosion resistant paints and lacquers and impregnants. They can also be hardened into flame resistant resins by reacting them in the usual manner with known hardeners such as carboxylic acid anhydrides, amines or amide-amines. For example, a material that is produced by the present method from maleic anhydride in the presence of a glycol will serve as a flame resistant fusible resin with good mechanical properties. It can be hardened more easily than, for example, the hardening of the polyepoxides with the high melting 3,4,5,6,7,7-hexachloro - 3,6 - endo-methylene-1, 2,3,6 - tetrahydrophthalic - acid-anhydride (M.P. 240° C.) which can also produce flame resistant products. The products acquire a particularly high activity by being hardened with acid anhydrides.

The following examples are given for the purpose of illustrating the claimed invention but it is distinctly understood that the invention is not limited either to the specific ingredients shown or to the particular operating procedures disclosed since various modifications will be obvious to one skilled in the art without departing from the concept of the invention covered by the appended claims.

EXAMPLE I (a) Production of low molecular weight, liquid 1,4-polybutadiene.

Into a 6 liter flask scavenged with nitrogen and containing 2250 parts by volume of benzene and 750 parts by volume of n-pentane, there was added at room temperature 29.8 parts by weight (240 mM.) of ethylaluminum-sesquichloride 15.42 parts by weight (60 mM.) of nickel-(II)-diacetylacetonate and 0.159 parts by weight (3 mM.) of acrylic nitrile and then at 0° C. with stirring there was added over a period of 5 hours 1175 parts by weight (21.75 mol) of butadiene-1,3 in gaseous form. After continuing the stirring for another hour, the catalyst was then destroyed by the addition of 200 parts by volume of methanol.

The reaction mixture was then subjected to distillation with steam and the polybutadiene reamining in the sump was separated from the heavier water. The polygutadiene was then extracted four times with 2000 parts by volume of methanol to remove any remaining catalyst, the upper lighter methanol layer being separated each time.

The polybutadiene was then freed in a thin film vaporizer at 100° C. and 50 torr pressure from any remaining methanol and traces of benzene.

Liquid polybutadiene in the amount of 920 parts by weight (81.7% theoretical) was obtained having the following properties: Viscosity (50° C.), 280 cp.; density (50°/4°), 0.8926; iodine nume, 449. According to infrared analysis 75% of the double bonds have 1,4-cis and 24% 1,4-trans configurations. The number of vinyl double bonds is less than 1%.

(b) Epoxidizing of low molecular weight liquid 1,4-polybutadiene.

800 parts by weight of the polybutadiene thus produced were reacted with 50 parts by weight of methylene chloride. While stirring and cooling the mixture at 30 to 40° C. 378 parts by volume of peracetic acid solution in ethyl acetate were added dropwise, the solution containing 97.5 parts by weight peracetic acid. After completion of the reaction the mixture was washed with 2 n-soda-lye and water. The organic phase was separated, dried over sodium sulfate and filtered. After evaporation of the solvent under vacuum, there remained a residue of 766 parts by weight of epoxidized polybutadiene having a viscosity of 430 centipoise at 50° C., an oxygen content of 3.3% and a hydroxyl group content of 0.2%.

(c) Addition of hexachlorcyclopentadiene.

387 parts by weight of epoxidized polybutadiene were mixed in a 1 liter three-necked flask with 546 parts by weight (2.0 mol) hexachlorcyclopentadiene with stirring in the presence of nitrogen and heated for 15 hours to 100° C. 322 parts by weight of non-reacted hexachlorcyclopentadiene were distilled off at 110° C. under 0.5 torr.

A yield of 448 parts by weight of a viscous liquid product was obtained, having a chlorine content of 27.5%, an oxygen content of 1.5%, and an iodine number of 246.

EXAMPLE II 378 parts by weight of the liquid polybutadiene of Example I (a) having the following properties: viscosity (50° C.), 280 cp.; density (50°/4°), 0.8926; iodine number 449; 75% of cis-, 24% of trans-, and less than 1% vinyl double bond, were stirred with 546 parts by weight (2.0 mol) of hexachlorcyclopentadiene and warmed to 100° C. for a period of 15 hours in the presence of nitrogen. The non-reacted hexachlorcyclopentadiene was then distilled off at 110° C. under 0.5 torr pressure. 337 parts by weight 1.23 mol) of hexachlorcyclopentadiene were recovered. The viscous liquid reaction product (560 parts by weight) had a chlorine content of 27.5%, an iodine number of 258, a viscosity at 50° C. of 2870 centipoise and a density (50°/4°) of 1.1185.

440 parts by weight of the chlorine-containing product thus produced were mixed with 100 parts by volume of methylene chloride. While stirring and cooling the mixture, 206 parts by volume of a solution of peracetic acid in ethyl acetate were added dropwise at 30–40° C., the solution containing 53.5 parts by weight of peracetic acid. The product was worked up as described under 1(b). 395 parts by weight were obtained of a low-molecular weight chlorine and epoxide-group-containing viscous polymer having a viscosity of 13,700 centipoise at 50° C., an oxygen content of 2.9% and a 0.1% content of hydroxyl groups as determined in infra-red analysis.

EXAMPLE III 378 parts by weight of low molecular weight polybutadiene having a viscosity (50° C.) of 400 centipoise, a density (50°/4°) of 0.8894, an iodine number of 446, with an 82% cis- and a 17% trans-content of double bonds, and a 1,2-portion of less than 1%, were heated with 546 parts by weight (2.0 mol) of hexachlorcyclopentadiene in a flask with agitation for a period of 15 hours under nitrogen to 100° C. 332 parts by weight of non-reacted hexachlorcyclopentadiene were removed by redistillation at 110° C. under 0.5 torr pressure.

540 parts by weight of a viscous addition product were obtained having a chlorine content of 28.3%, an iodine number of 247, and a viscosity of 4240 centipoise at 50° C.

439 parts by weight of the above product were epoxidized as described in Example II. The amount of peracetic acid was calculated on the basis of an epoxide-oxygen content of about 5%. The yield amounted to 415 parts by weight of the desired product having an oxygen content of 5.3% and a viscosity of 1680 poise at 50° C.

EXAMPLE IV 324 parts by weight of low molecular weight polybutadiene having a viscosity (50° C.) of 153 centipoise, a density (50°/4°) of 0.8907, an iodine number of 451, a 78% cis- and a 21% trans-content of double bonds, and a 1,2- content of less than 1%, were heated in a flask with 273 parts by weight (1 mol) of hexachlorcyclopentadiene with agitation for a period of 14 hours to 100° C. under nitrogen. 134 parts by weight of the non-reacted hexachlorcyclopentadiene were then removed by distillation at 110° C. under 0.5 torr pressure.

The yield amounted to 444 parts by weight of a viscous reaction product having a chlorine content of 21.5%, a viscosity (50° C.) of 470 centipoise, an iodine number of 295, and a density (50°/4°) of 1.0537.

325 parts by weight of the material obtained as above described were epoxidized as described in Example II, by the addition of peracetic acid to a calculated epoxide-oxygen content of about 11%. The yield amounted to 345 parts by weight of a viscous product containing 11.3% oxygen, 0.8% hydroxyl groups and a viscosity of 1300 poise at 50° C.

EXAMPLE V 985 parts by weight of low molecular weight polybutadiene having a viscosity of 180 centipoise at 50° C., a density (50°/4°) of 0.8948, an iodine number of 436, a 66% cis- and 33% trans-content of double bonds, 1,2-content of less than 1%, were reacted as described in Example I(b) with an amount of peracetic acid calculated on the basis of an oxygen content of about 5%. The yield amounted to 960 parts by weight of epoxidized polybutadiene containing 5.4% oxygen and 0.3% hydroxyl groups. Its viscosity at 50° C. was 490 centipoises and the epoxide-oxygen content as determined by hydrobromic acid in glacial acetic acid was 4.6%.

397 parts by weight of the polybutadiene having an epoxide-oxygen content of about 5% and an iodine number of 391 were heated with 273 parts by weight (1.0 mol) hexachlorcyclopentadiene without any diluent for a period of 15 hours at 100° C. with stirring and under nitrogen. The non-reacted hexachlorcyclopentadiene was removed by distillation at 110° C. under 0.5 torr pressure.

The yield amounted to 653 parts by weight of a viscous addition product having a chlorine content of 34.4%, an iodine number of 202 and an oxygen content of 3.0%.

EXAMPLE VI 200 parts by weight of a commercial epoxidized 1,2-polybutadiene having an epoxide content of 7.2%, a total oxygen content of 9.95%, a viscosity of 279 centipoises at 50° C. and an iodine number of 214 were heated with 136.5 parts by weight (0.15 mol) hexachlorcyclopentadiene at 100° C. for a period of 15 hours under nitrogen with stirring. The mixture was then distilled under vacuum at 110° C. under 0.5 torr pressure to recover 5 parts by weight of hexachlorcyclopentadiene.

330 parts by weight of a viscous reaction product were obtained having a chlorine content of 31.2%, an iodine number of 96.7 and a total oxygen content of 6.0%.

EXAMPLE VII (a) Into a 4 liter reaction flask containing 2000 parts by volume of isopropylcyclohexane there was added at room temeprature 94.4 parts by weight (0.64 mol) of $BF_3$-diethyletherate and 5.76 parts by weight (0.32 mol) of water. 1077 parts by weight (19.9 mol) butadiene-1,3 were then introduced in gaseous form at 0° C. during a period of 6 hours and at the same time 20 parts by volume of benzene with 100 parts by volume of isopropylcyclohexane were added dropwise to bring the volume up to 120 parts.

The catalyst was then rendered inactive by the addition of 300 parts by volume of methanol and the reaction-product washed and neutralized three times, each time with 2000 parts by volume of water to which sodium bicarbonate was added. The isopropylcyclohexane phase containing the polybutadiene was separated each time from the water and then dried with calcium chloride. The isopropylcyclohexane was finally distilled off under the vacuum of a water aspirator.

The yield amounted to 910 parts by weight (84.5% of the theoretical) of a low-molecular weight liquid polybutadiene having a viscosity of 860 centipoises at 50° C., a density (50°/4°) of 0.9333, an iodine number of 362.5, an infrared-estimated 68% 1,4-trans- and 10% 1,4-cis-content of double bonds, and 22% vinyl-double bonds.

(b) 810 parts by weight of the above polybutadiene were heated with 546 parts by weight (2.0 mol) of hexachlorcyclopentadiene at 100° C. with stirring and under nitrogen for a period of 15 hours. 340 parts by weight of non-reacted hexachlorcyclopentadiene were then removed by distillation at 110° C. under 0.5 torr pressure.

The yield amounted to 1010 parts by weight of a viscous liquid product having a viscosity of 4340 centipoises at 50° C., a density (50°/4°) of 1.0667, an iodine number of 289.5 and a chlorine content of 18.2%.

(c) 400 parts by weight of the polymer produced as described under (a) and (b) were reacted with peracetic acid, as described in Example II, to a calculated epoxide-oxygen content of 2.5%. The yield amounted to 363 parts by weight of the desired product having an oxygen content of 2.8% and a viscosity of 22,000 centipoises at 50° C.

We claim:
1. An epoxidized viscous liquid reaction product of:
  (A) a polymer of a diolefin selected from the group consisting of butadiene, isoprene, piperylene, chloroprene, phenylbutadiene, 2,3-dimethylbutadiene, cyanobutadiene, and mixtures thereof, said polymer having an average molecular weight of at least 300, and
  (B) a polyhalogenated cyclopentadiene; the weight concentration of epoxide oxygen in said epoxidized reaction product being 0.5–15%, and the content of halogen being sufficient to impart flame resistance to said reaction product.
2. A product as defined by claim 1 wherein the weight concentration of halogen in said epoxidized reaction product is 10–40%.
3. A product as defined by claim 1 wherein said polymer is a 1,4-polybutadiene having an average molecular weight of 500–50,000.
4. A product as defined by claim 3 wherein said polyhalogenated cyclopentadiene is hexachlorocyclopentadiene.
5. A product as defined by claim 4 wherein the weight concentration of halogen in said epoxidized reaction product is 10–40%.
6. A product as defined by claim 1 wherein said polymer is a 1,4-polybutadiene having an average molecular weight of 1,000–20,000 containing predominantly cis-double bonds and containing less than 1% vinyl-double bonds.
7. A product as defined by claim 6 wherein said polyhalogenated cyclopentadiene is hexachlorocyclopentadiene.
8. A product as defined by claim 7 wherein the weight concentration of halogen in said epoxidized reaction product is 10–40%.
9. A product as defined by claim 1 wherein the polymer is a polybutadiene comprising 10–82% cis-double bonds, 17–68% trans-double bonds, not more than 22% vinyl double bonds, and has a viscosity of 153–860 centipoises at 50° C., an iodine number of 362.5–451, and a density of 0.8894–0.9333 at 50° C., and said polyhalogenated cyclopentadiene is hexachlorocyclopentadiene,
  said reaction product having an epoxide oxygen content of 1.5–11.3%, a minimum chlorine content of 18.2 before epoxidation and a maximum of 34.40% after epoxidation, and a viscosity of 1,300–22,000 centipoises at 50° C.

References Cited

UNITED STATES PATENTS

| | | | |
|---|---|---|---|
| 2,826,556 | 3/1958 | Greenspan et al. | 260—348 |
| 2,833,747 | 5/1958 | Greenspan et al. | 260—348 |
| 2,834,790 | 5/1958 | Bressler et al. | 260—348 |
| 2,842,513 | 7/1958 | Fitzgerald | 260—348 |
| 2,882,279 | 4/1959 | Luvisi et al. | 260—348 |
| 2,992,193 | 7/1961 | Porret et al. | 260—348 |
| 3,030,336 | 4/1962 | Greenspan et al. | 260—348 |
| 3,133,092 | 5/1964 | Nowlin et al. | 260—348 |
| 3,253,000 | 5/1966 | Kirchhof et al. | 260—348 |
| 3,098,058 | 7/1963 | Schwecker et al. | 260—94.7 |

FOREIGN PATENTS

| | | |
|---|---|---|
| 1,120,137 | 12/1961 | Germany. |
| 1,131,345 | 6/1962 | Germany. |
| 18,545 | 9/1963 | Japan. |

NORMA S. MILESTONE, Primary Examiner

U.S. Cl. X.R.

260—88.3, 91.5, 92.3, 93.1, 93.5, 94.7, 649, 651, 654, 655, 680, 836, 875, 880, 881, 884, 885, 886, 887, 888, 889, 890, 898, 899.